United States Patent
Baranyai et al.

(10) Patent No.: US 12,168,208 B2
(45) Date of Patent: Dec. 17, 2024

(54) BATTERY PASTE MIXER AND METHOD

(71) Applicant: Wirtz Manufacturing Company, Inc., Port Huron, MI (US)

(72) Inventors: Stephen G. Baranyai, Auburn Hills, MI (US); Timothy D. Magee, Peck, MI (US); Robert N. Wirtz, Royal Oak, MI (US)

(73) Assignee: Wirtz Manufacturing Company, Inc., Port Huron, MI (US)

( * ) Notice: Subject to any disclaimer, the term of this patent is extended or adjusted under 35 U.S.C. 154(b) by 1114 days.

(21) Appl. No.: 17/044,114

(22) PCT Filed: Apr. 10, 2019

(86) PCT No.: PCT/US2019/026774
§ 371 (c)(1),
(2) Date: Sep. 30, 2020

(87) PCT Pub. No.: WO2019/199959
PCT Pub. Date: Oct. 17, 2019

(65) Prior Publication Data
US 2021/0138417 A1 May 13, 2021

Related U.S. Application Data

(60) Provisional application No. 62/657,022, filed on Apr. 13, 2018.

(51) Int. Cl.
*B01F 35/92* (2022.01)
*B01F 23/50* (2022.01)
(Continued)

(52) U.S. Cl.
CPC ............ *B01F 35/92* (2022.01); *B01F 23/511* (2022.01); *B01F 23/53* (2022.01); *B01F 23/54* (2022.01);
(Continued)

(58) Field of Classification Search
CPC ....... B01F 35/92; B01F 2035/98; H01M 4/20; F28D 1/06; F25D 17/02; B01J 19/0013
See application file for complete search history.

(56) References Cited

U.S. PATENT DOCUMENTS 2,277,526 A * 3/1942 Mojonnier ............... A01J 9/04
366/144
3,318,376 A * 5/1967 Vihl ...................... B21D 53/02
165/169
(Continued)

FOREIGN PATENT DOCUMENTS

CN 203944334 U 11/2014
CN 104241609 A * 12/2014
(Continued)

OTHER PUBLICATIONS

Quantitative Comparison of Temperature Control of Reactors with Jacket Cooling or Internal Cooling Coils William L. Luyben. Industrial & Engineering Chemistry Research 2004 43 (11), 2691-2703 DOI: 10.1021/ie030721h (Year: 2004).*
(Continued)

*Primary Examiner* — Marc C Howell
*Assistant Examiner* — Patrick M McCarty
(74) *Attorney, Agent, or Firm* — REISING ETHINGTON, P.C.

(57) ABSTRACT

A machine for and method of making a paste of active material for application to a grid to make a plate for a lead acid battery. In the machine and method sulfuric acid, at least one dry additive and red lead or leady oxide are mixed together and the mixture is cooled by a plurality of cooling zones to maintain the mixture at a temperature not greater than a predetermined maximum temperature.

20 Claims, 4 Drawing Sheets

(51) Int. Cl.

| | |
|---|---|
| *B01F 23/53* | (2022.01) |
| *B01F 25/50* | (2022.01) |
| *B01F 27/82* | (2022.01) |
| *B01F 35/71* | (2022.01) |
| *B01F 35/90* | (2022.01) |
| *H01M 4/20* | (2006.01) |
| *H01M 4/56* | (2006.01) |
| *H01M 4/21* | (2006.01) |

(52) U.S. Cl.
CPC ............. *B01F 25/50* (2022.01); *B01F 27/82* (2022.01); *B01F 35/71731* (2022.01); *B01F 35/90* (2022.01); *H01M 4/20* (2013.01); *H01M 4/56* (2013.01); *B01F 2035/98* (2022.01); *H01M 4/21* (2013.01)

(56) References Cited

U.S. PATENT DOCUMENTS

| | | | |
|---|---|---|---|
| 3,576,675 A | | 4/1971 | Abramson et al. |
| 4,074,969 A | | 2/1978 | Lawrence |
| 4,346,022 A | | 8/1982 | Walcott et al. |
| 4,618,478 A | * | 10/1986 | McKinney ............. C01G 21/06 422/198 |
| 5,096,611 A | | 3/1992 | Matthew et al. |
| 5,150,831 A | * | 9/1992 | Jordan ..................... F28D 1/06 228/183 |
| 5,252,105 A | * | 10/1993 | Witherspoon .......... H01M 4/62 423/619 |
| 5,667,758 A | * | 9/1997 | Matsugi ................... B01J 3/046 220/585 |
| 6,531,248 B1 | | 3/2003 | Zguris et al. |
| 2005/0005629 A1 | | 1/2005 | Zhao et al. |
| 2005/0265120 A1 | | 12/2005 | Naoe |
| 2007/0140050 A1 | | 6/2007 | Humphrey |
| 2008/0003501 A1 | | 1/2008 | Vincze et al. |
| 2016/0288154 A1 | | 10/2016 | Mendoza et al. |
| 2017/0142980 A1 | * | 5/2017 | Hall ....................... A21C 1/1495 |
| 2018/0171044 A1 | * | 6/2018 | Wolf ....................... C08F 110/02 |

FOREIGN PATENT DOCUMENTS

| | | | | |
|---|---|---|---|---|
| CN | 106099031 A | | 11/2016 | |
| CN | 107507962 A | * | 12/2017 | ............ H01M 10/12 |
| DE | 3047099 A1 | | 10/1981 | |
| EP | 2158961 B1 | * | 9/2011 | ................ B01F 3/18 |
| EP | 2735366 A1 | | 5/2014 | |
| FR | 2918246 A1 | | 1/2009 | |
| GB | 522912 A | | 7/1940 | |
| GB | 1232336 A | | 5/1971 | |
| GB | 1572647 A | | 7/1980 | |
| WO | WO9014693 A2 | | 11/1990 | |
| WO | WO0126170 A1 | | 4/2001 | |
| WO | WO2013101254 A1 | | 7/2013 | |

OTHER PUBLICATIONS

English Translation of CN203944334U, Dai et al., obtained on Dec. 13, 2023 from <https://worldwide.espacenet.com/> (Year: 2023).*
Sovema. Paste Mixers [online]. Sep. 2014 [retrieved on May 10, 2024]. Retrieved from the Internet: <https://hpinstruments.com/wp-content/uploads/2014/12/sovema_paste_mixer.pdf > (Year: 2014).*
Kiessling, R., Lead Acid Battery Formation Techniques [Online], Dec. 2012 [retrieved on May 10, 2024]. Retrieved from the Internet: <https://mathscinotes.com/wp-content/uploads/2012/12/lead_acid.pdf> (Year: 2012).*
Pavlov, D., & Ruevski, S. (2001). Semi-suspension technology for preparation of tetrabasic lead sulfate pastes for lead-acid batteries. Journal of power sources, 95(1-2), 191-202. (Year: 2001).*
Partial European Search Report for Application No. EP19784618 dated Apr. 29, 2021 (14 pages).
PCT/US2019/026774 International Search Report and Written Opinion mailed Jul. 1, 2019 (Jul. 1, 2019).
Extended European Search Report for Application No. EP19784618.1 dated Aug. 3, 2021 (12 pages).
Brazilian Office Action for Brazilian Application No. BR112020020921-0 dated Jan. 10, 2023 (4 pages).
English Translation of Brazilian Office Action for Brazilian Application No. BR112020020921-0 dated Jan. 10, 2023 (2 pages).
European Office Action for European Application No. 19784618.1 dated Jul. 4, 2022 (5 pages).
Brazilian Office Action for Brazilian Application No. BR112021020332-0 dated Feb. 24, 2023 (4 pages).
English Translation of Brazilian Office Action for Brazilian Application No. BR112021020332-0 dated Feb. 24, 2023 (2 pages).
Extended European Search Report for European Application No. 19924494.8 dated Apr. 13, 2023 (6 pages).
Vogel et al., "Vacuum- and air-cooled mixing of lead/acid battery paste: a comparison of the production results", Journal of Power Sources, Elsevier, Amsterdam, NL, vol. 53, No. 2, Feb. 1, 1995, pp. 269-271.
European Office Action for European Application No. 19784618.1 dated Nov. 2, 2023 (5 pages).

* cited by examiner

BATTERY PASTE MIXER AND METHOD

REFERENCE TO RELATED APPLICATIONS

This application claims the benefit of U.S. Provisional Application Ser. No. 62/657,022 filed on Apr. 13, 2018, the entire contents of which are incorporated herein by reference in its entirety.

TECHNICAL FIELD

This application relates to lead acid batteries and more particularly to a machine and method of making a paste of active material for application to a grid to make a plate for a lead acid battery.

BACKGROUND

Lead-acid batteries typically include a plurality of negative and positive plates each of which includes a lead or lead alloy grid to which a layer of battery paste (chemically active material) has been applied, dried, formed and hydrolyzed. In commercial manufacture of batteries a viscous paste may be applied to the grid by a pasting machine which may have a hopper from which this paste is forced through an orifice and onto an underlying grid as it passes under the orifice. In commercial production, the viscous paste may be made in relatively large batches each typically weighing about 1,500 to 5,000 pounds and then delivered to the hopper of the pasting machine which may apply a ton or more of paste to a series of a plurality of battery grids in 12-25 minutes of operation.

A lead acid battery paste may be a mixture of fine particles of red lead or leady oxide, water, sulfuric acid and various additives such as carbon black, barium sulfate, lingo sulfonate, sulfonated naphthalene, etc. When making a batch of battery paste the ingredients may be mixed together in a covered bowl or enclosed container. Typically, the dry ingredients such as the fine particles of red lead and/or leady oxide and the dry additives are first mixed together and then water is added and mixed with the dry mixture. Thereafter, sulfuric acid is added and mixed in the bowl with these ingredients which produces an exothermic reaction heating the mixture. For batteries supplying power for electric starters of engines such as automotive and marine engines, and electric motors starting under load, the mixture is cooled in the bowl at least after the acid is added and mixed with the other ingredients so that the maximum temperature of the mixture does not exceed about 120° F. to 140° F. to produce a tribasic lead sulfate paste. For batteries requiring a large capacity of reserve power and long cycle life, such as marine batteries the temperature of the mixture is allowed to rise to a controlled 175° F. to 195° F. during mixing to produce a tetrabasic lead sulfate paste. After mixing is completed both types of paste may be cooled to less than about 120° F. (for proper paste application) and then transferred from the mixer bowl to the hopper of the pasting machine.

Typically, while being mixed in a mixer bowl the mixture is cooled by (1) a single water jacket providing a single zone of water flowing around a metal side wall of the bowl, (2) this single side wall water jacket and a single water jacket providing a single zone of water flowing across the overlying metal bottom of the bowl in heat transfer relationship with the metal bottom of the bowl and (3) a high velocity stream (usually at least 3,000 CFM) of chilled air flowing through the bowl above and in contact with the mixture in the bowl.

During mixing of the fine particles of red lead and/or lead oxide and some of the additives such as carbon black they usually enter the high velocity air stream flowing through the bowl which may present a potential human health risk if they become airborne in the atmosphere outside of the bowl and thus air filtration bag house and/or scrubber systems have typically been used to address this matter. These bag house and scrubber systems must be maintained and regularly cleaned all at significant expense.

SUMMARY OF THE INVENTION

A method of mixing the ingredients for a battery paste may include mixing the ingredients in a closed container with bottom and side walls, circulating a cooling fluid thorough each of at least two separate cooling jackets in heat transfer relationship with a bottom wall of the container at least while sulfuric acid is mixed with the ingredients to control and limit the maximum temperature of the mixture until mixing is completed, and after completion of mixing cooling and removing the mixture from the container. The process may also include circulating cooling fluid through each of at least two separate cooling jackets in heat transfer relationship with a sidewall of the container at least while sulfuric acid is being mixed with the ingredients.

A mixing machine and method for making an active material paste for a lead acid battery may have a closed bowl in which the ingredients for the paste may be mixed together such as by rotating paddles, muller wheels, beaters, or the like. The bottom of the bowl may include at least two separate cooling jackets or zones through each of which a cooling fluid such as cold or chilled water or a mixture of water and additives such as rust inhibitors, antifreeze, etc. may flow. A generally cylindrical side wall of the bowl may also include at least two separate cooling jackets or zones through each of which a cooling fluid such as chilled water or water with additives may separately flow through each water jacket or zone.

The method and the mixing machine may also include sealing the container while the ingredients are mixed in the container so that the ingredients essentially may not pass out of the container to the outside atmosphere while the ingredients are mixed in the container. To further inhibit particulate ingredients from passing out of the sealed container, the pressure in the sealed container may be maintained at substantially atmospheric or sub-atmospheric pressure by exhausting air at a low velocity through the sealed container and passing the exhausted air through a HEPA filter to remove any entrained ingredient particles and exhausting the filtered clean air into the atmosphere. If needed in some applications, to condense any water vapor or steam produced by the exothermic reaction (of the acid and red lead or leady oxide) the sealed container may also include a condenser device in the sealed container and disposed in an upper portion of the bowl above the mixture in the sealed container.

Optionally, a stream of a cool or chilled gas such as air may also flow through an upper portion of the bowl for contact with the upper surface of the ingredients being mixed therein to assist in further cooling the ingredients during mixing to produce the battery paste.

BRIEF DESCRIPTION OF THE DRAWINGS

The following detailed description of certain embodiments and best mode will be set forth with reference to the accompanying drawings, in which.

DETAILED DESCRIPTION

Figure 1:
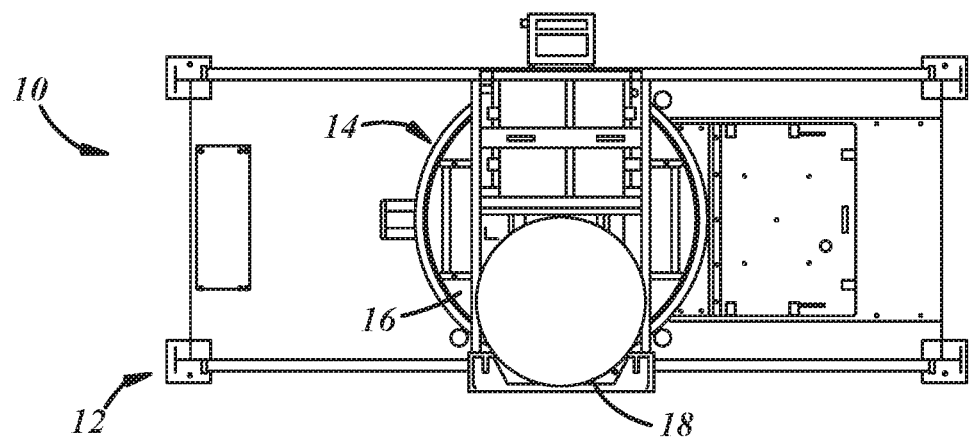
FIG. 1 is a top view of a machine for mixing the ingredients of a paste for application to a grid of a lead acid battery.
Figure 2:
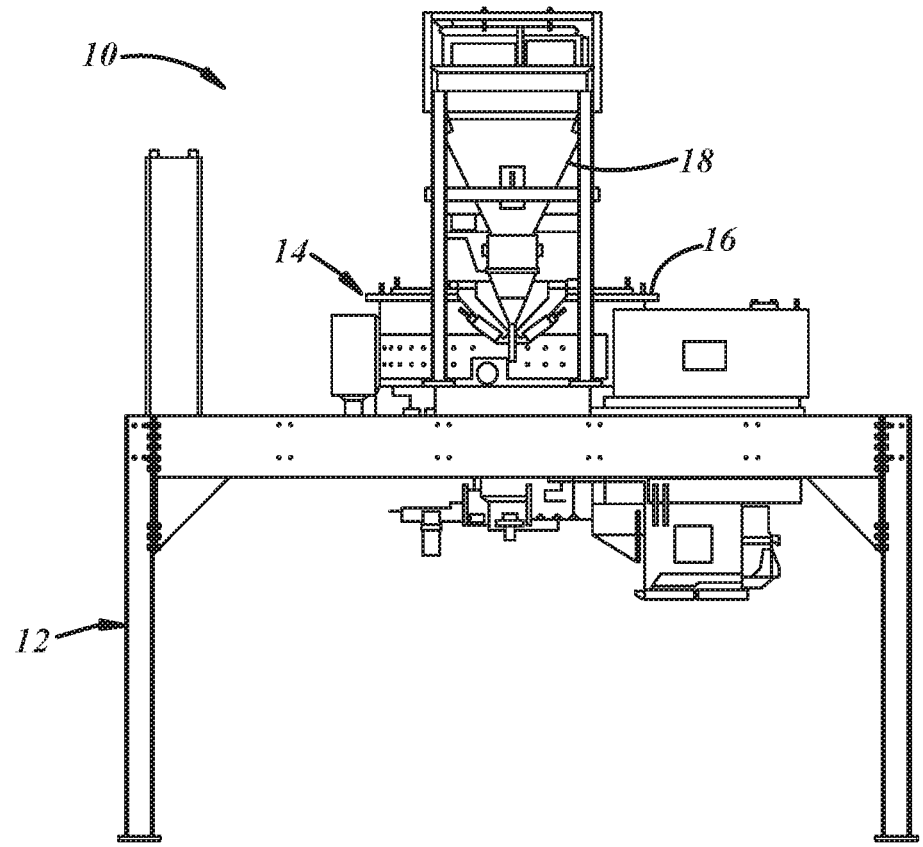
FIG. 2 is a side view of the mixing machine of FIG. 1.
Figure 4:
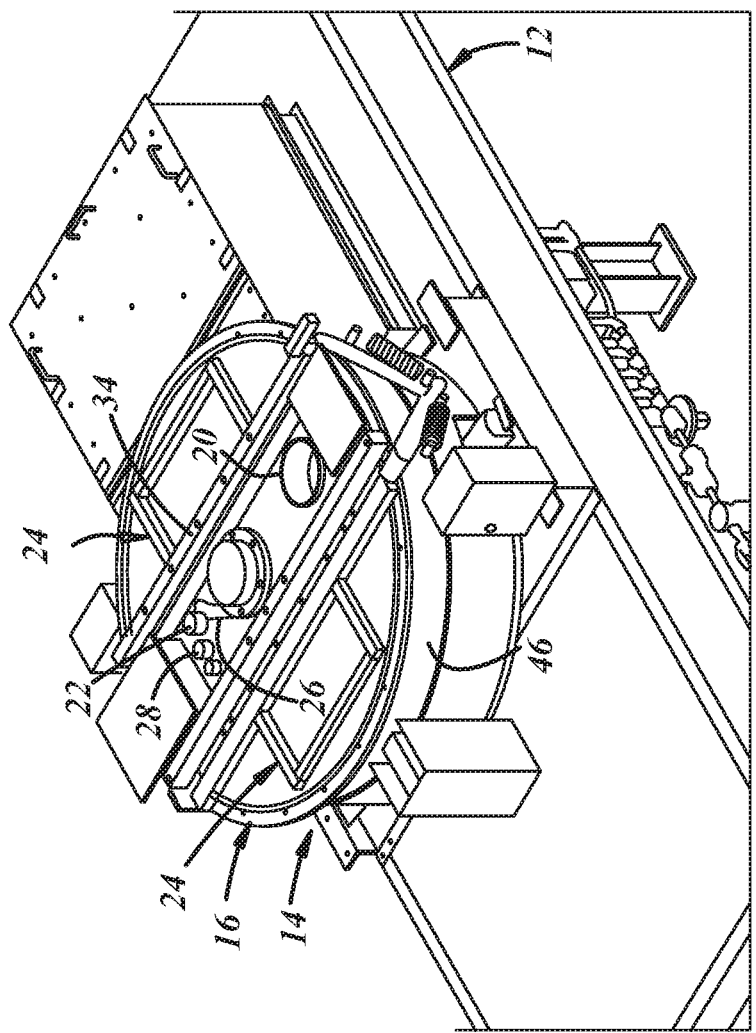
FIG. 4 is an enlarged isometric view of a mixing bowl with a cover of the machine of FIG. 1.
Figure 3:
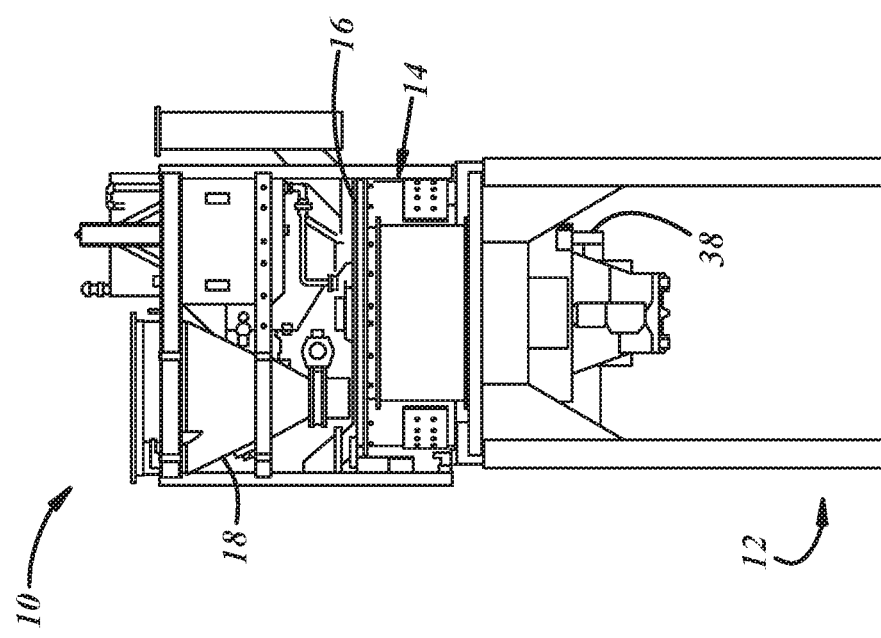
FIG. 3 is an end view of the mixing machine of FIG. 1.

Referring in more detail to the drawings, FIGS. 1-4 illustrate a machine 10 for mixing together the ingredients to make a paste (active material) to be applied to a grid for making positive and/or negative plates for a lead acid battery. Typically the composition and density of the paste may vary somewhat depending on whether it is for a negative or a positive plate. Typically, lead acid batteries have a plurality of positive and negative plates arranged in cells in a case in contact with an electrolyte of weak sulfuric acid.

The mixing machine 10 may have a base frame 12 carrying a mixing bowl 14 with a cover 16, and a hopper 18 for supplying finely divided red lead and/or leady oxide into the bowl through a port 20 in the cover. Additives and expanders and any other dry materials may be supplied to the bowl through a port 22 through the cover 16 and/or access doors 24 in the cover. The doors also provide access to the bowl for cleaning and maintaining it. The doors are normally closed and sealed with the cover during mixing of ingredients in the bowl. Sulfuric acid may be added to the bowl such as by conventional plumbing with a flow control valve through a port 26 through the cover which port is desirably adjacent the center of the bowl. Water may be supplied to the bowl through a water port 28 which desirably may be spaced radially outwardly of the acid port 26 such as by conventional plumbing with a flow control valve as is well known to those skilled in the art.

Figure 5:
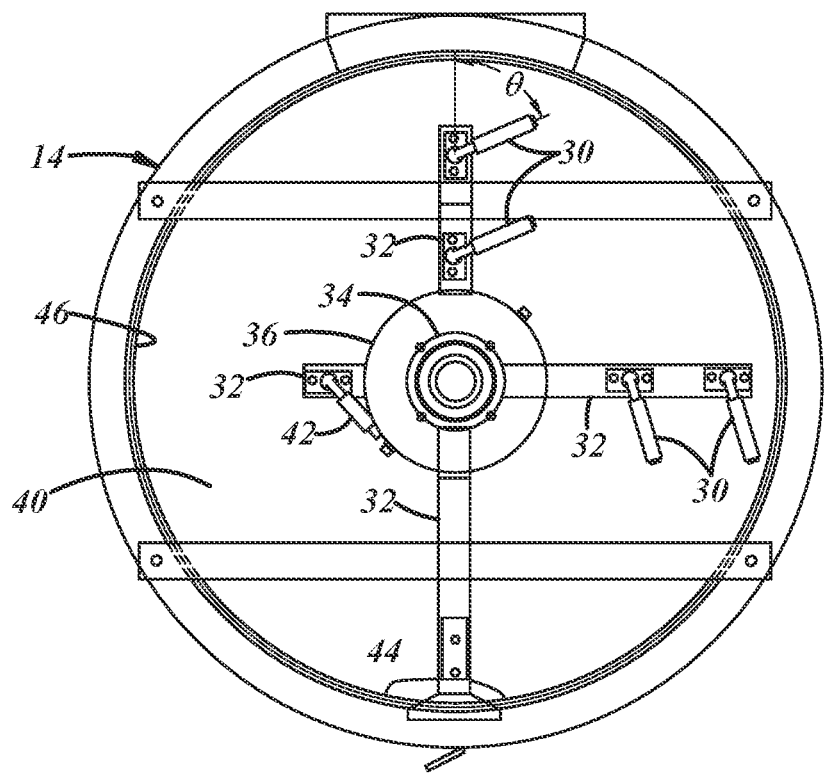
FIG. 5 is a top view of the mixing bowl of the machine of FIG. 1 with the cover removed.

In the bowl the ingredients may be mixed together by muller wheels, paddles, or other suitable mixing apparatus. As shown in FIG. 5, ingredients in the bowl may be mixed by paddles 30 carried by arms 32 circumferentially spaced apart and attached to a hub 34 attached to a shaft journaled for rotation in a housing 36 and driven for rotation by an electric motor 38. If desired, the motor may be a variable speed motor such as a stepper motor and the drive may include a speed reducing gearbox. The paddles 30 may be attached to their associated arm at different radial distances from the axis rotation and inclined at the same or different included angles Ø relative to their associated arm. The paddles 30 may extend generally axially downward toward and close to a generally planar bottom wall 40 of the bowl. One or more arms 32 may also carry a scraper 42 with its leading edge disposed close to the housing 36. A scraper 44 may be disposed close to a sidewall 46 of the bowl.

When mixing the ingredients to make battery paste an exothermic reaction between the red lead or leady oxide and the sulfuric acid rapidly produces significant heat which may be detrimental to paste for automotive batteries and other batteries used for applications needing an initial high power output such as for starting various internal combustion engines, powering electric motors or the like.

Figure 6:
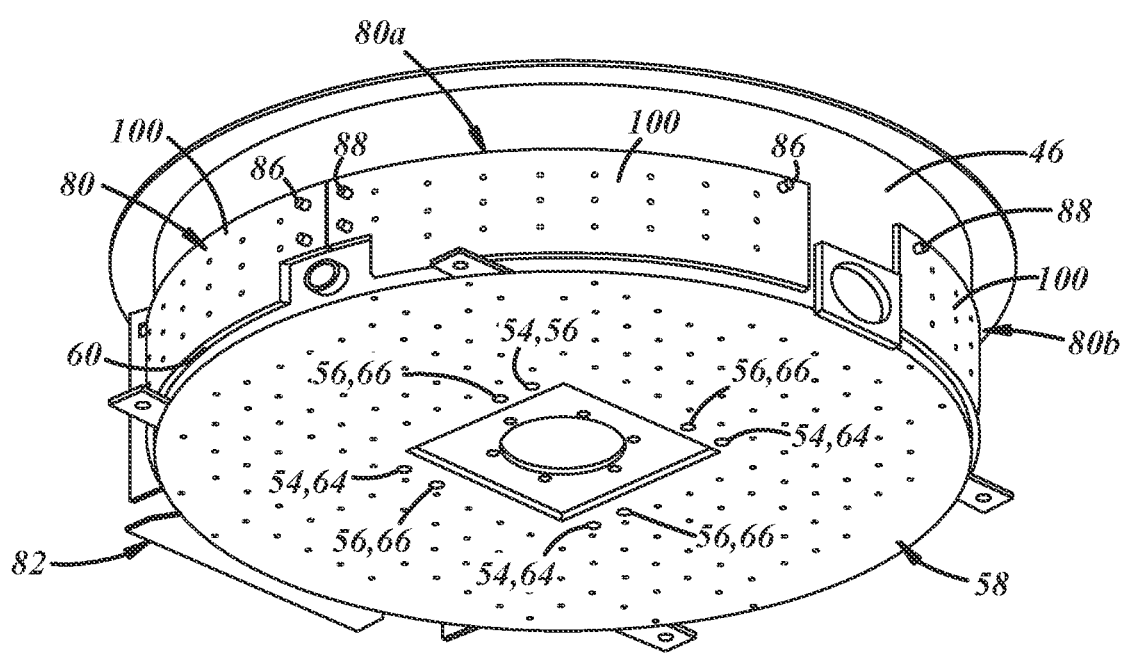
FIG. 6 is an isometric view of the mixing bowl illustrating cooling jackets on the bottom and side walls of the bowl.
Figure 7:
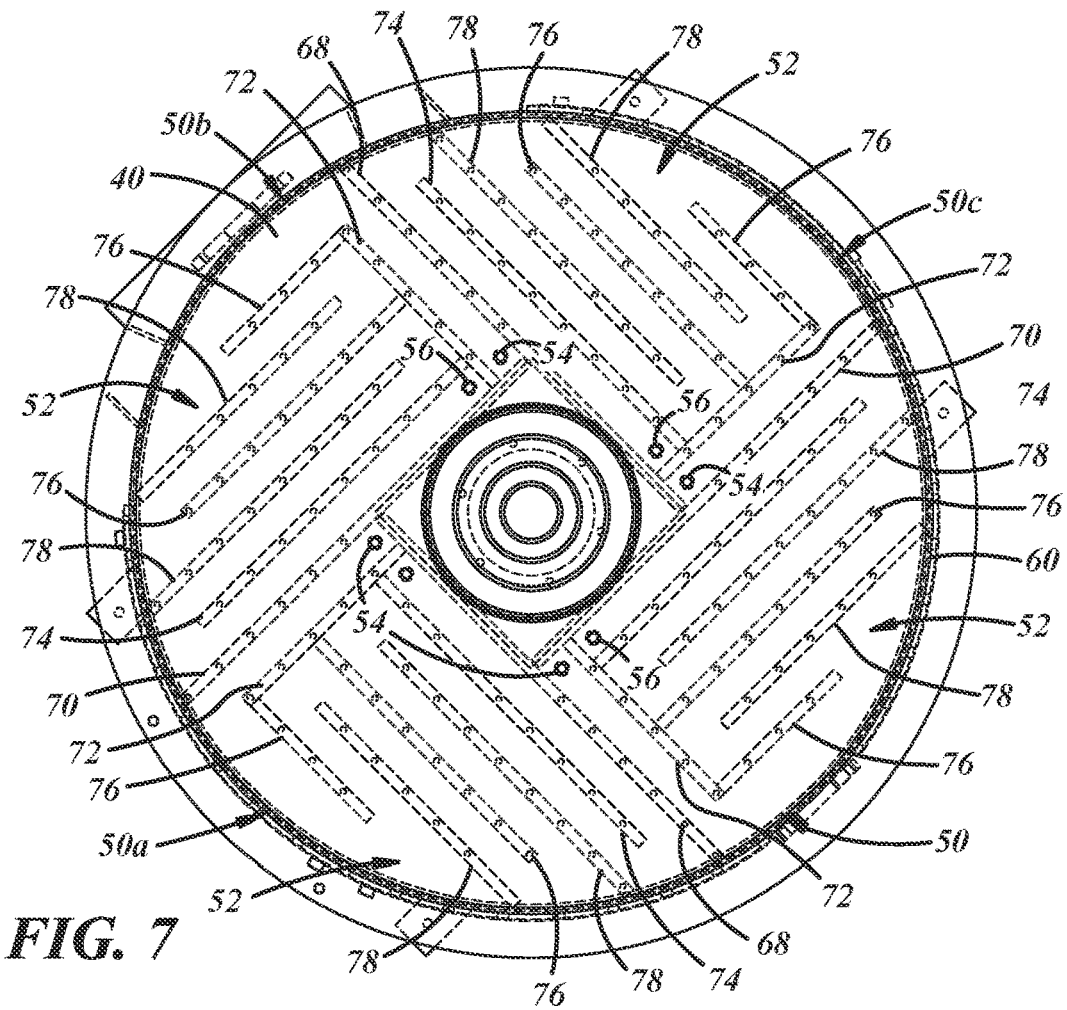
FIG. 7 is a bottom view of the mixing bowl illustrating the layout of four cooling jackets on the bottom wall of the bowl.

To rapidly transfer or remove sufficient heat from the mixture of the ingredients while mixing them, the bowl should have at least two and desirably three or four separate cooling jackets. As shown in FIGS. 6 and 7, the bowl 10 has four separate cooling jackets 50, 50a, 50b, 50c each in heat transfer relationship with the thermally conductive bottom wall 40 of the bowl. Each cooling jacket may have a sinuous coolant fluid flow passage 52 with an inlet 54 adjacent one end and an outlet 56 adjacent the other end of the flow passage. The sinuous flow passage may be formed in part by a plurality of longitudinally extending bars received and desirably sealed between the bowl bottom wall 40 and an underlying cover plate 58 which may be secured and sealed to an annular rim or a bottom edge 60 of the bowl sidewall 46 below the bottom wall 40 of the bowl. The inlet and outlet may be tubes 64,66 attached to the cover plate 58 and opening into the flow passage 52 of the cooling jacket. The bars may be of a metal such as steel and attached and sealed to the bowl bottom wall 40 of a thermally conductive metal such as steel such as by a weld or a suitable adhesive.

As best shown in FIG. 7, the perimeter of each of the bottom cooling jackets may be formed by a portion of the rim 60 and two sets of first bars 68 and second bars 70 each sealed at an outer end to the rim. Each first bar 68 at its other end may be sealed to an intermediate portion of an associated second bar 70. Each second bar 70 may be perpendicular to the first bars 68 and at its other end may be sealed to an intermediate portion of an associated one of the first bars. An inlet portion of the flow passage 52 of each cooling jacket may include a third bar 72 parallel to and laterally spaced from the adjacent first or second bar 68 or 70 and at one end desirably sealed to the other of the first and second bars, and at the other end terminating short of the rim 60. An outlet portion of the flow passage 52 of each cooling jacket may include a fourth bar 74 parallel to and laterally spaced from the adjacent second or first bar 70 or 68 and with one end desirably sealed to the other of the second or first bars, and the other end terminating short of the rim 60. Interconnecting portions of the flow passage 52 of each cooling jacket may include alternating fifth 76 and sixth 78 bars laterally spaced apart and each parallel to the fourth bar 74. One end of each fifth bar 76 may be sealed with the third bar 72 and with its other end terminating short of the rim. One end of each sixth bar 78 may be sealed with the rim 60 and with its other end terminating short of the third bar 72.

The volume of each flow passage and its average cross sectional area and the temperature and flow rate of coolant through the passage of each cooling jacket are designed to be sufficient to control and maintain the desired maximum temperature of all of the ingredients in the bowl throughout completion of their mixing together in the bowl. For a prototype mixing machine 10 with a bowl steel bottom wall 40 in the range of 4-8 feet in diameter with an interior surface area of about 12-52 square feet in contact with the mixture, collectively the cooling jackets may have a flow passage with a volume in the range of about 70%-100%, desirable 75%-95% and preferably 80%-90% of the interior surface area of the bottom wall 40 or in the range of about 1,900 to 7,000 cubic inches. This total volume should be distributed between the number of bottom wall cooling jackets i.e. for four such jackets each flow passage should have about ¼+/− of this total volume. Each flow passage may have an average cross sectional flow area (perpendicular to the direction of flow) of about 0.5 to 5 square inches, desirably about 1 to 3 square inches and preferably about 1.5 square inches. The ingredients in the bowl may be mixed with a plurality of radially spaced apart paddles 30 rotating at a speed in the range of about 20-50 rpm and desirably about 30-40 rpm. In use a coolant of chilled liquid water which may include rust inhibitors and if desired antifreeze may flow through each cooling jacket at a rate of about 5-60 gallons per minute and desirably 30-40 gallons per minute and typically with an inlet temperature in the range of about 40° F. to 90° F. and desirably about 40° F. to 55° F. It has been empirically determined that this prototype machine with this coolant temperature and flow rate can maintain the maximum temperature of a batch of about 3050 pounds of all paste ingredients being mixed in the bowl in the range of about 110° F. to 140° F. and desirably 130° F. and will decrease the time to make a batch of about 3050 pounds of tribasic lead sulfate paste by about 15-50% or from about 18 minutes to 12 minutes compared to the same size and similarly constructed machine having only a single water cooling jacket under and in heat transfer relationship with substantially the entire surface area of the steel bottom wall of a mixing bowl having the same inside diameter of 4.3-8 feet, the same axial height of the sidewall in the range of 24 to 40 inches and the same arrangement of the same paddles 30 rotating at substantially the same speed of about 36 rpm. This prior art machine also has a single sidewall cooling jacket and a recirculating high velocity air flow under its cover and over and above the top of the ingredients of about 3,500 cubic feet per minute at a temperature in the range of about 40° F. to 60° F. which required an exhaust baghouse or scrubber to remove lead and lead oxide particles, carbon black and other particulates from this airflow to comply with environmental protection requirements and inhibit operator exposure to these airborne particles.

Figure 8:
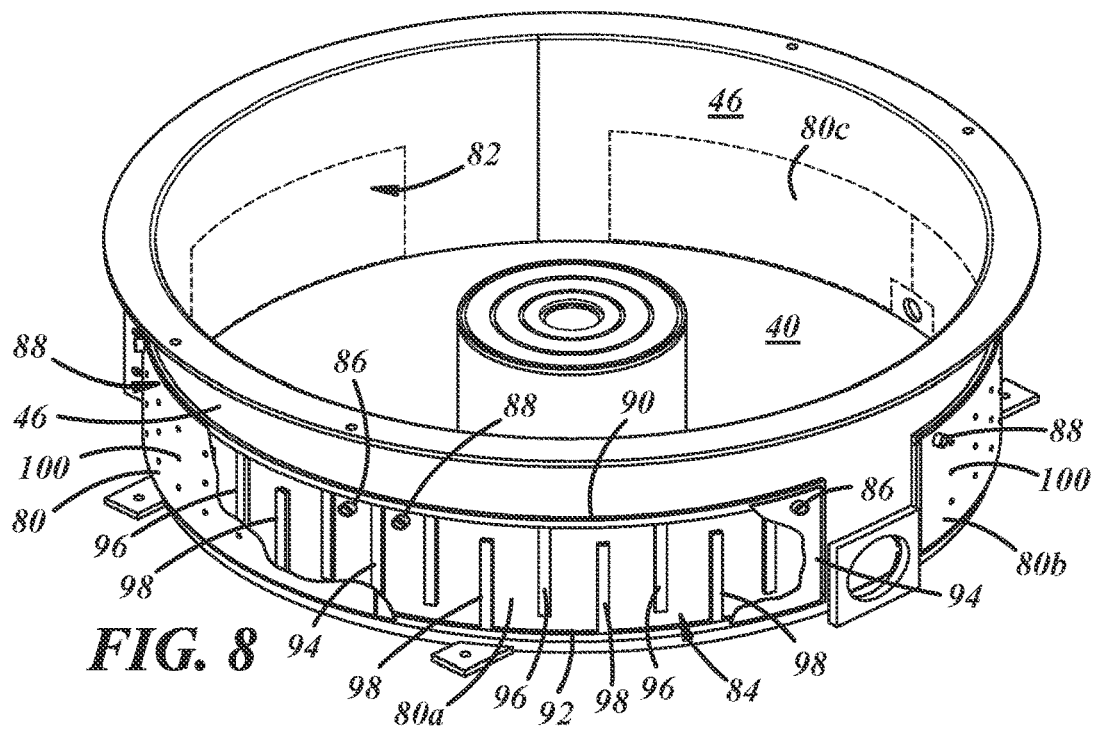
FIG. 8 is an isometric view of the mixing bowl with portions broken away illustrating water jackets on a side wall of the bowl.

Optionally the mixing machine 10 may also include at least two and desirably three or four cooling jackets in heat transfer relationship with the thermally conductive sidewall 46 of a metal such as steel. As shown in FIGS. 6 and 8 the machine 10 may have four separate cooling jackets 80, 80*a*, 80*b*, 80*c* collectively circumferentially extending around the exterior of the sidewall 46 except for various areas for the paste discharge outlet 82 through the sidewall and other attachments to or through the sidewall. Collectively these four cooling jackets 80-80*c* may extend around at least 50 percent and desirably about 60 percent, and preferably about 65 percent of the circumference of the exterior of the sidewall 46 and may extend axially or vertically on the sidewall at least 40 percent of its vertical or axial height, desirably about 45 to 50 percent of its vertical or axial height, and preferably about 55 percent of its vertical or axial height from the bottom toward the top of the bowl sidewall. If desired, the sidewall cooling jacket may extend over substantially the entire vertical or axial extent of the sidewall 46 which may aid in condensing some of the water vapor and any steam produced during the mixing of the ingredients of the paste.

As shown in FIGS. 6 and 8 each of the optional sidewall cooling jackets 80-80*c* may have a sinuous flow passage 84 with an inlet 86 adjacent one end and an outlet 88 adjacent the other end of the flow passage. Each jacket may have a perimeter defined at least in part by first 90 and second 92 arcuate bars laterally or vertically spaced apart and extending circumferentially along and attached and sealed to the outside of the sidewall 46 and axially extending end bars 94 which at their ends may be sealed to the first 90 and second 92 bars and attached and sealed to the sidewall. The sinuous flow passage 84 may be defined in part by a series of generally axially extending and circumferentially spaced apart alternating bars 96 and 98 with one end sealed to one and the other of the circumferentially extending first and second bars 90 and 92 and at the other end terminating short of the other circumferential first or second bar. Each of the bars 96 and 98 is desirably sealed and attached to the sidewall. All of the bars of each cooling jacket may be of steel and attached and sealed to a steel sidewall such as by welding or by a suitable adhesive. An outer cover 100 overlies the bars and may be attached and sealed to the perimeter circumferential bars 90,92 and end bars 94 such as by welding a cover of metal such as steel to these metal bars. The cover 100 may also be maintained in firm engagement with the axial bars 96 and 98 such as by spot welding or may be attached and sealed to the bars by a suitable adhesive. If it is desired that the cover be removable it may be attached to the bars by a series of cap screws or the like threaded into the bars. Coolant inlet and outlet tubes of metal may be attached to a cover 100 of metal such as by welding and communicate with the flow passage desirably between one of the axial end bars 94 and its adjacent bar 94 or 96. One tube may serve as the cooling fluid inlet and the other as its outlet.

The sidewall cooling jackets collectively may have flow passages 84 with a volume of about 60% to 100%, desirably 70% to 95%, and preferably 80% to 90% of the surface area of the sidewall or about 2,000 to 7,500 cubic inches. This total volume will be distributed among the number of sidewall cooling jackets desirably about substantially equally. Each flow passage may have an average cross sectional flow area (perpendicular to the direction of flow) in the range of about 1.0 to 4.5 square inches, desirably about 2 to 3 square inches and preferably about 2.25 to 2.75 square inches. In use cooling water may flow through each cooling jacket at a flow rate of about 5 to 60 gallons per minute and desirably about 30-40 gallons per minute with an inlet temperature to each separate cooling jacket flow passage of about 40° F. to 90° F. and desirably 45° F. to 55° F.

For the prototype mixing machine described above for making a batch of about 3050 pounds of battery paste the addition of these four sidewall cooling jackets 80-80*c*, through which chilled water flowed with an inlet temperature of about 50° F. and a flow rate of about 35 gallons per minute, further decreased the time for making a batch of tribasic lead sulfate battery paste by about 1-3 minutes.

It has been empirically determined that a batch of high quality tribasic lead sulfate paste of about 1200 kilograms or 3050 pounds can be produced by this prototype mixing machine in about 10-12 minutes including about 2 minutes for charging the bowl with all of the dry ingredients and mixing them in the bowl before water was added, 2 minutes for adding water and mixing it with the dry ingredients, and about 6-8 minutes for adding the dilute sulfuric acid and mixing it with the ingredients to produce a homogenous high quality paste ready for discharge from the prototype machine and use in pasting grids to produce either positive or negative plates depending on the composition, density and moisture content of the paste. During mixing the ingredients reached a maximum temperature of about 130° F. and were cooled to about 100° F. before being discharged from the bowl.

For at least most applications the plurality of bottom only or bottom and sidewall cooling jackets maintains a low enough maximum temperature of all of the ingredients of the paste while being mixed in the bowl, so that the bowl may be closed and substantially sealed during mixing such as by a suitable cover 16 without the need to circulate or pass any cooling air through the bowl during mixing to make a batch of paste therein. This essentially prevents any of the ingredients from escaping to the atmosphere outside of the bowl and thus eliminates the need for any system of air bag house filtration or air scrubbers to remove particulate ingredients from the air stream that would otherwise pass through the bowl. This also eliminates the significant operating expense of maintaining and removing particulate contaminants from the air bag or scrubber system and decreases the risk of exposure of operating personnel to airborne particulate matter.

If desired, the risk of particulate ingredients passing out of a sealed bowl can be further reduced by exhausting fresh air at a low velocity through the sealed bowl above the mixture and through a downstream HEPA filter at a flow rate of about 100 to 600 CFM and desirably 100 to 400 CFM such via a bowl one way inlet, across the bowl, through a one-way bowl outlet, a HEPA filter by an exhaust fan and to the atmosphere.

If desired at least some of the water vapor and any steam produced during mixing in the sealed bowl can be condensed by a cooling device in the sealed bowl and adjacent the top of the sealed bowl such as a chilled plate or a chilled cooling coil operating at a maximum temperature of about 50° F.

The method of making large batches of battery paste for positive or negative plates for a lead acid battery, typically on the order of 1,500 to 5000 pounds per batch, includes mixing together all of the ingredients of the paste at a desired controlled temperature and a desired maximum temperature depending on the type of paste by a mixing machine 10 with multiple separate cooling jackets in heat transfer relationship with at least 50%, desirably 60%, and preferably 70% of the surface area of the bowl or container in contact with all of the ingredients for the paste while being mixed together in the container. In at least some implementations of the method a plurality of only bottom cooling jackets are needed in heat transfer relationship collectively with at least 70%, desirably 80%, and preferably 85% of only the bottom surface area of the container in contact with the ingredients when all of the ingredients for a batch of paste are in the container and are being mixed together in the container. During mixing together of all of the ingredients for a batch of tribasic lead sulfate paste, cooling fluid flowing through only bottom cooling jackets can maintain a predetermined desired maximum temperature of the mixture.

The disclosed method and mixing machine for making a batch of battery paste for a lead acid battery may have none, one or more of the significant practical advantages of greatly reducing the time required to make a batch of paste typically in the range of 1,500 to 5,000 pounds, maintaining a desired controlled temperature and maximum temperature of all of the ingredients of the paste during mixing to facilitate and improve the application of the mixed paste to a grid, improved performance characteristics of the maximum initial power output of batteries with plates made with tribasic lead sulfate paste and cycle life and reserved capacity of tetrabasic lead sulfate paste produced by this method and/or machine, producing a homogenous mixture of the ingredients of the mixed paste, and producing a high quality paste having enhanced desirable performance characteristics such as improved control of paste density, improved control of paste moisture content, and improved control of the formation of tribasic lead sulfate paste and improved control of tetrabasic lead sulfate crystals of such paste. The disclosed method and machine greatly reduces and may even eliminate the need to pass a large volume of chilled air through the container to adequately cool the paste and maintain a satisfactory maximum temperature of the mixture of all the ingredients of the paste during mixing thereof. The mixing of all the ingredients in a sealed container without flowing any cooling air through the container also significantly decreases the cost of making a batch of battery paste and greatly decreases the likelihood that any particulate ingredients of the mixture may enter the atmosphere outside of the container and exposure operating personnel and other equipment to airborne particulate ingredients.

The forms of the invention herein disclosed constitute presently preferred embodiments and many other forms and embodiments are possible. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A machine for mixing ingredients for making a batch of paste for a lead acid battery comprising:
    a round container with a bottom wall having a diameter of at least 4 feet and with a sidewall;
    an apparatus at least in part in the container for mixing together a plurality of ingredients for making a batch of battery paste;
    and a plurality of separate cooling jackets each in heat transfer relationship with the bottom wall of the container and configured to transfer heat from the ingredients and through the bottom wall of the container to maintain a temperature of the ingredients throughout the mixing of the ingredients in the container of not greater than a predetermined maximum temperature;
    the plurality of cooling jackets collectively are in heat transfer relationship with at least 60% of the area of the bottom wall of the container in contact with the ingredients being mixed in the container to make a batch of paste;
    the average cross-sectional flow area of each cooling jacket perpendicular to the direction of flow is in the range of 0.5 to 5 square inches; and
    each cooling jacket is configured to receive a flow of liquid cooling fluid separate from the other cooling jackets and at a flow rate in the range of 5 to 60 gallons per minute, the liquid cooling fluid having an inlet temperature range of 40° F. to 90° F.;
    wherein at least some of the plurality of separate cooling jackets have a sinuous fluid flow passage through each of some of the cooling jackets, wherein the sinuous flow passage is formed by a portion of a rim of the sidewall, two sets of first bars and second bars, and an inlet portion of the fluid flow passage includes a third bar, wherein each second bar is perpendicular to the first bars and is sealed to an intermediate portion of an associated one of the first bars, and wherein the third bar is parallel to and laterally spaced from the adjacent first or second bar.

2. The mixing machine of claim 1 configured for supplying a separate flow of cooling fluid through each of the separate cooling jackets, each at a predetermined inlet temperature of the cooling fluid to provide sufficient heat transfer from the ingredients being mixed in the container to maintain the predetermined maximum temperature or a lower temperature through the completion of mixing of all of the ingredients in the container.

3. The mixing machine of claim 1 wherein the coolant flow rate is between 30 to 60 gallons per minute.

4. The mixing machine of claim 1 wherein the plurality of cooling jackets collectively are in heat transfer relationship with at least 80% of the area of the bottom wall of the container in contact with the ingredients being mixed in the container to make a batch of paste.

5. The mixing machine of claim 1 wherein the liquid coolant flows through the sinuous flow passage of at least some of the plurality of separate cooling jackets each in heat transfer relationship with the bottom wall of the container at a rate of between 30 to 60 gallons per minute.

6. The mixing machine of claim 1 wherein during mixing the container is closed and there is no forced air flow through the container.

7. The mixing machine of claim 1 wherein collectively the cooling jackets in heat transfer relationship with the bottom of the container are configured to maintain the predetermined maximum temperature in the range of 175° F. to 195° F. of the mixture in the container when each of the cooling jackets has a flow of cooling fluid through it separate from the other cooling jackets.

8. The machine of claim 1 which also comprises a plurality of separate cooling jackets each in heat transfer relationship with the sidewall of the container and configured to transfer heat from the ingredients and through the sidewall of the container to maintain in conjunction with the plurality of separate cooling jackets each in heat transfer relationship with the bottom wall of the container the temperature of the ingredients throughout the mixing of the ingredients in the container of not greater than the predetermined maximum temperature.

9. The mixing machine of claim 8 wherein the plurality of separate cooling jackets each in heat transfer relationship with the sidewall of the container collectively extend around at least 50% of the circumference of the exterior of the sidewall of the container.

10. The mixing machine of claim 8 wherein at least some of the plurality of separate cooling jackets each in heat transfer relationship with the sidewall of the container have a sinuous cooling passage and the mixing machine is configured to supply a separate flow of cooling liquid through each such sinuous passage at a flow rate of at least 10 gallons per minute.

11. The mixing machine of claim 1 wherein at least some of the plurality of separate cooling jackets each have a sinuous fluid flow passage and collectively the cooling jackets in heat transfer relationship with the bottom of the container are configured to maintain the predetermined maximum temperature at not more than 140° F. of the mixture in the container when each of the cooling jackets has a separate flow of cooling fluid through it.

12. The mixing machine of claim 11 wherein during mixing the container is closed and there is no forced air flow through the container.

13. The mixing machine of claim 11 wherein the flow passage of at least some of the plurality of separate cooling jackets each in heat transfer relationship with the bottom wall have an average cross-sectional area perpendicular to the direction of fluid flow through the flow passage in the range of 1 to 3 square inches.

14. The mixing machine of claim 13 wherein the liquid coolant flows through the sinuous flow passage of at least some of the plurality of separate cooling jackets each in heat transfer relationship with the bottom wall of the container at a rate of between 10 to 60 gallons per minute.

15. A method of making a batch of battery paste in a container with a bottom wall and with a sidewall with ingredients including particles of red lead and/or leady oxide, particles of at least one dry additive and sulfuric acid, the method comprising:
    mixing together the at least one dry additive and the red lead and/or leady oxide for at least 2 minutes before mixing with any sulfuric acid;
    mixing the sulfuric acid with the mixture of the at least one dry additive and the red lead and/or leady oxide for at least 6 minutes;
    cooling the mixture with the sulfuric acid therein to maintain a maximum temperature of such mixture of not greater than 195° F.; and
    completing all mixing of dry ingredients and sulfuric acid in 12 minutes,
    wherein the ingredients are mixed in the container, the container being a closed container, with a plurality of separate cooling jackets each in heat transfer with the bottom wall of the container with each cooling jacket having a separate coolant passage, and at least some of the plurality of separate cooling jackets have a sinuous fluid flow passage through each of some of the cooling jackets, wherein the sinuous flow passage is formed by a portion of a rim of the sidewall, two sets of first bars and second bars, and an inlet portion of the fluid flow passage includes a third bar, wherein each second bar is perpendicular to the first bars and is sealed to an intermediate portion of an associated one of the first bars, and wherein the third bar is parallel to and laterally spaced from the adjacent first or second bar.

16. The method of claim 15 wherein the ingredients are mixed in a container, during mixing the container is closed, and during mixing there is no forced air flow through the closed container.

17. The method of claim 15 wherein the maximum temperature of such mixture is not greater than 140° F.

18. The method of claim 15 further comprising the step of flowing a supply of liquid coolant through each coolant passage of each cooling jacket separate from the other cooling jackets and at a rate of at least 5 gallons per minute to maintain the maximum temperature of such mixture of not greater than 195° F.

19. The method of claim 18 wherein the coolant passage of at least some of the cooling jackets is sinuous and has an average cross-sectional area perpendicular to the direction of the liquid coolant flow through such passage in the range of 0.5 to 5 square inches.

20. The method of claim 18 wherein the ingredients are mixed in a container, during mixing the container is closed, and during mixing there is no forced air flow through the closed container.

* * * * *